United States Patent
Chung et al.

(10) Patent No.: US 7,489,937 B2
(45) Date of Patent: Feb. 10, 2009

(54) METHOD AND APPARATUS FOR DETECTING EMITTER MOVEMENT

(75) Inventors: Hyo K. Chung, Greenville, TX (US); David L. Reid, Richardson, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 424 days.

(21) Appl. No.: 11/316,297

(22) Filed: Dec. 22, 2005

(65) Prior Publication Data
US 2007/0146198 A1 Jun. 28, 2007

(51) Int. Cl.
*H04Q 7/20* (2006.01)
(52) U.S. Cl. .................................. 455/456.1; 342/84
(58) Field of Classification Search .............. 455/404.2, 455/456.1
See application file for complete search history.

(56) References Cited

U.S. PATENT DOCUMENTS

| 5,008,679 A | 4/1991 | Effland et al. |
| 5,488,369 A | 1/1996 | Miller |
| 2003/0017832 A1* | 1/2003 | Anderson et al. ........... 455/456 |

* cited by examiner

*Primary Examiner*—Rafael Pérez-Gutiérrez
*Assistant Examiner*—Marcos Batista
(74) *Attorney, Agent, or Firm*—Hovey Williams LLP

(57) ABSTRACT

A method and apparatus for detecting emitter movement. The method and apparatus generally include acquiring a measured signal characteristic corresponding to a signal emitted from an emitter, estimating a signal characteristic corresponding to the signal, and comparing the measured and estimated signal characteristics to determine if the emitter is moving. Such a configuration enables a rapid and accurate detection of emitter movement without requiring multiple measurements, complex systems, or time-consuming calculations.

12 Claims, 3 Drawing Sheets

Where
$\tau_1, \tau_2$ – TDOAs
$p_i$ – platform location vector, $i = 1,2,3$
$v_i$ – platform velocity vector, $i = 1,2,3$
$v_1(r), v_2(r)$ – theoretically computed FDOAs
$v_{c1}(r), v_{c2}(r)$ – measured FDOAs
$v_T$ – FDOA measurement error
$f_0$ – signal center frequency
$c$ – speed of light Where
$\tau_1, \tau_2$ – TDOAs
$p_i$ – platform location vector, i = 1,2,3
$v_i$ – platform velocity vector, i = 1,2,3
$v_1(r), v_2(r)$ – theoretically computed FDOAs
$v_{c1}(r), v_{c2}(r)$ – measured FDOAs
$v_T$ – FDOA measurement error
$f_0$ – signal center frequency
c – speed of light

METHOD AND APPARATUS FOR DETECTING EMITTER MOVEMENT

A computer program listing appendix containing the source code of a computer program that may be used with the present invention is incorporated herein by reference and appended hereto as one (1) original compact disc, and an identical copy thereof, containing a total of 1 file as follows:

| Date of Creation | Size (Bytes) | Filename |
|---|---|---|
| Nov. 25, 2005 | 17,102 | code.txt |

BACKGROUND OF THE INVENTION

1. Field of the Invention

The present invention relates to signal tracking. More particularly, the invention relates to a method and apparatus that utilize an estimated and a measured signal characteristic to efficiently detect emitter movement.

2. Description of the Related Art

The ability to track signals is becoming increasingly important as the use of wireless communications devices becomes commonplace throughout the world. For example, the U.S. Federal Communications Commission Enhanced 911 (E911) rules will eventually require cellular telephone carriers to identify the geolocations, i.e. the physical source locations, of subscribers who place emergency calls to 911 or other services. Additionally, wireless communication device users often desire to acquire accurate geolocations for navigation purposes, such as to generate a route between a current location and a destination. Further, military and law enforcement agencies often desire to locate sources of emitted signals for tracking and targeting purposes.

To assist in signal tracking and geolocation determination, it is often desirable to detect if signal emitters are moving or stationary. Methods and systems have been developed to detect emitter movement utilizing repeated, complex, and time consuming calculations. For example, some of these methods include continuously calculating geolocations of emitted signals and comparing currently calculated geolocations to previously calculated geolocations to determine if geolocations have changed. Unfortunately, continuously calculating geolocations requires multiple measurements and calculations over a substantial period of time, thereby increasing the cost and time required to detect emitter movement.

Other developed methods of detecting emitter movement include utilizing several collection systems and/or several signal measurements to detect emitter movement utilizing a plurality of discrete signal measurements. Although such methods may be more efficient than continuously calculating geolocations, they require complex and costly systems, such as a network of at least four collector elements, or include often inaccurate assumptions regarding emitter velocity, thereby reducing their effectiveness. Thus, the ability to accurately detect emitter movement is often limited due to the lack of functionality of developed methods and systems.

SUMMARY OF THE INVENTION

The present invention solves the above-described problems and provides a distinct advance in the art of signal tracking. More particularly, the invention provides a method and apparatus that utilize an estimated and a measured signal characteristic to efficiently detect emitter movement. Such a configuration enables a rapid and accurate detection of emitter movement without requiring multiple measurements, complex systems, or time-consuming calculations.

One embodiment of the present invention provides a method of detecting emitter movement. The method generally includes acquiring a measured signal characteristic corresponding to a signal emitted from an emitter, estimating a signal characteristic corresponding to the signal, and comparing the measured and estimated signal characteristics to determine if the emitter is moving.

In another embodiment, the measured and estimated signal characteristics each correspond to frequency-difference-of-arrival (FDOA) and the estimated FDOA is acquired utilizing time-difference-of-arrival/time-difference-of-arrival (TDOA/TDOA) geolocation information. The measured and estimated FDOAs are preferably compared utilizing an error value to determine if the emitter is moving.

Another embodiment of the present invention provides a computer-readable medium encoded with a computer program for enabling a computer to perform a method of detecting emitter movement. The performed method generally includes acquiring a measured signal characteristic corresponding to a signal emitted from an emitter, estimating a signal characteristic corresponding to the signal, and comparing the measured and estimated signal characteristics to determine if the emitter is moving.

In another embodiment, the present invention provides a computing element operable to detect emitter movement. The computing element generally includes a memory and a processor coupled with the memory. The memory is operable to store a measured signal characteristic corresponding to a signal emitted from an emitter. The processor is operable to estimate a signal characteristic corresponding to the signal and compare the measured signal characteristic to the estimated signal characteristic to determine if the emitter is moving.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
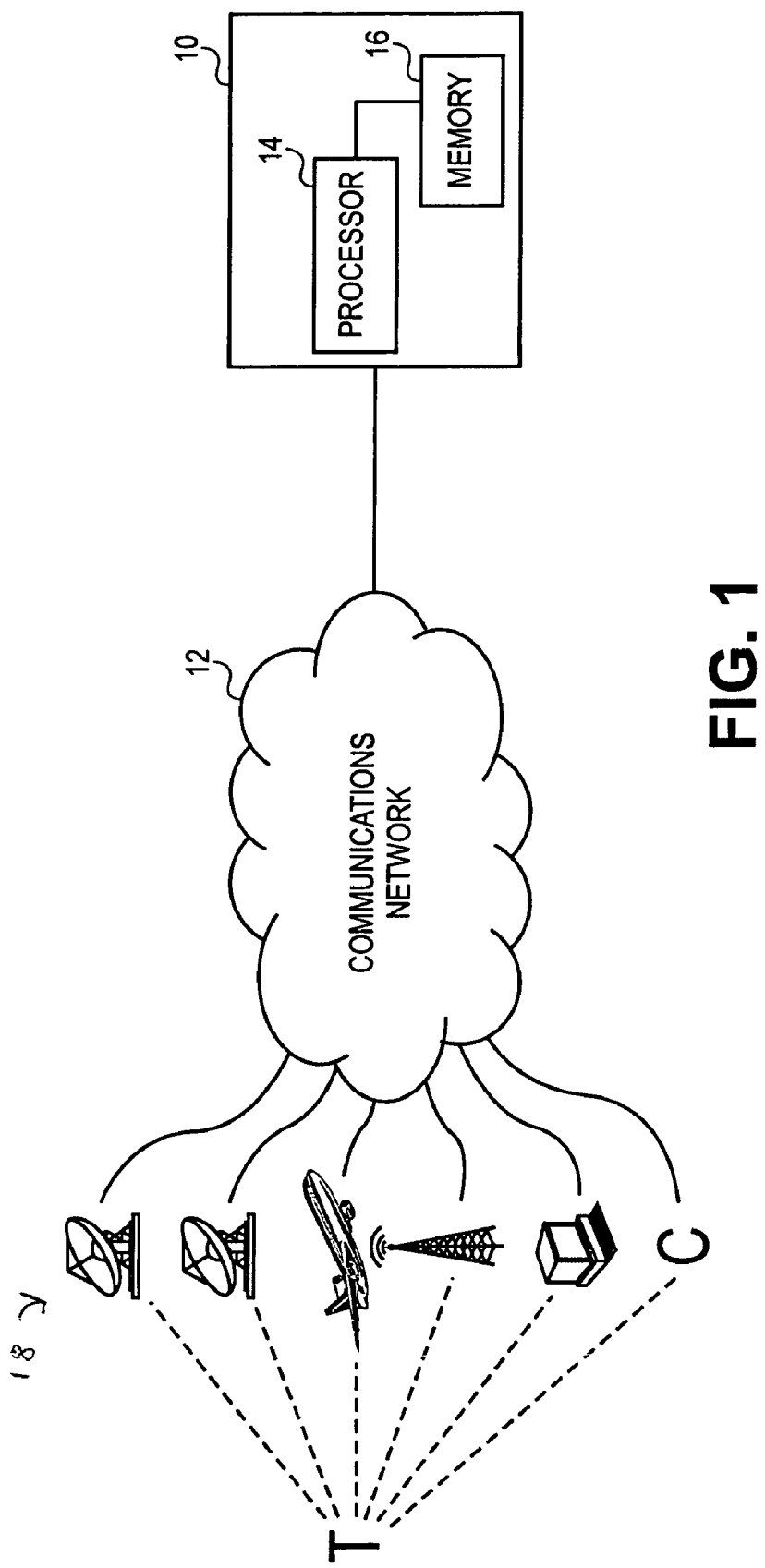
FIG. 1 is a block diagram of some of the elements operable to be utilized by various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Methods consistent with the present teachings are especially well-suited for implementation by a computing element 10, as illustrated in FIG. 1. The computing element 10 may be a part of a communications network 12 that enables various devices to exchange information and data. The computing element 10 may include a processor 14 coupled with a memory 16 to perform the various functions described herein. As should be appreciated, the processor 14 and memory 16 may be integral or discrete and comprise various generally conventional devices, such as microcontrollers, microprocessors, programmable logic devices, desktop computers, servers, portable computing devices, etc.

Additionally, the computing element 10 may include additional devices, such as a display for indicating processed information, i.e. a geolocation, or additional processing and memory elements. Further, the computing element 10 may comprise a plurality of computing elements or a network of computing elements such that one or more portions of the invention may be implemented utilizing a first computing element and one or more other portions of the invention may be implemented utilizing a second computing element.

The present invention can be implemented in hardware, software, firmware, or combinations thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings. It will also be appreciated that the principles of the present invention are useful independently of a particular implementation, and that one or more of the steps described herein may be implemented without the assistance of the computing element 10.

Computer programs consistent with the present teachings can be stored in or on a computer-readable medium residing on or accessible by the computing element 10, such as the memory 16, for instructing the computing element 10 to implement the method of the present invention as described herein. The computer program preferably comprises an ordered listing of executable instructions for implementing logical functions in the computing element 10 and other computing devices coupled with the computing element 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media.

In the context of this application, a "computer-readable medium", including the memory 16, can be any means that can contain or store the program for use by or in connection with the instruction execution system, apparatus, or device. The computer-readable medium can be, for example, but not limited to, an electronic, magnetic, optical, or semi-conductor system, apparatus or device. More specific, although not inclusive, examples of the computer-readable medium would include the following: a portable computer diskette, a random access memory (RAM), a read-only memory (ROM), an erasable, programmable, read-only memory (EPROM or Flash memory), an optical fiber, and a portable compact disc (CD) or a digital video disc (DVD).

As shown in FIG. 1, the computing element 10 is preferably directly or indirectly coupled with one or more collector elements 18 to enable function of the present invention as described herein. It should be appreciated the computing element 10 and the collector elements 18 may be integral such as where one or more of the collector elements 18 are operable to independently perform signal tracking as described herein. Thus, the computing element 10 and collector elements 18 need not necessarily be coupled through the communications network 12 with other devices or collector elements to enable operation of the present invention.

The collector elements 18 may include any devices or elements that are operable to detect and/or otherwise receive an emitted electromagnetic signal. Thus, the collector elements 18 may include stationary and non-stationary antennas, uni-directional and omni-directional antennas, electrical elements operable to relay a signal, etc. In various embodiments the collector elements 18 may comprise a plurality of communication towers, such as cellular-phone towers, associated via the communications network 12. Thus, the present invention is not limited to the utilization of only one type or configuration of collector elements 18.

Figure 2:
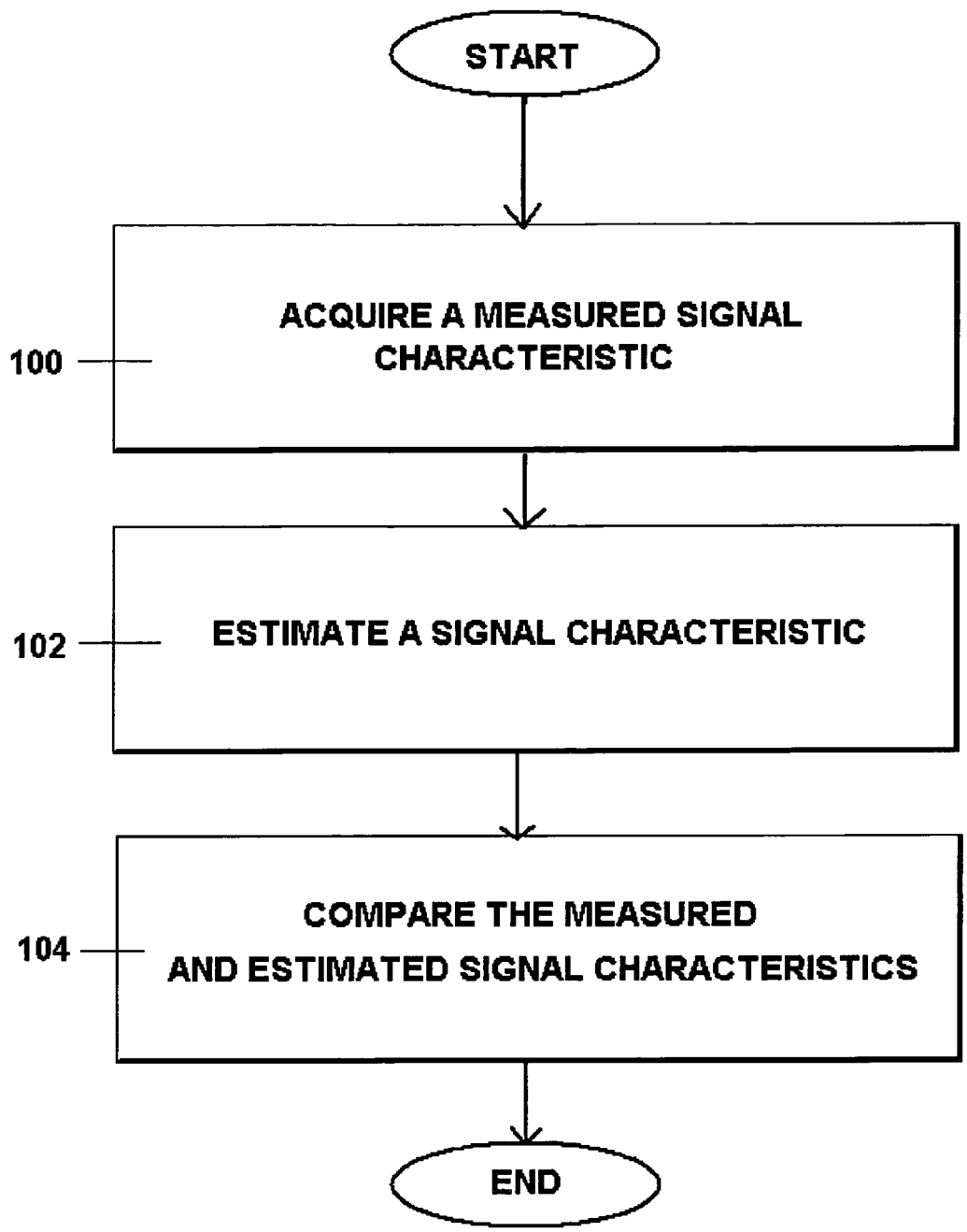
FIG. 2 is a flow chart showing some of the steps operable to be performed by the present invention.
Figure 3:
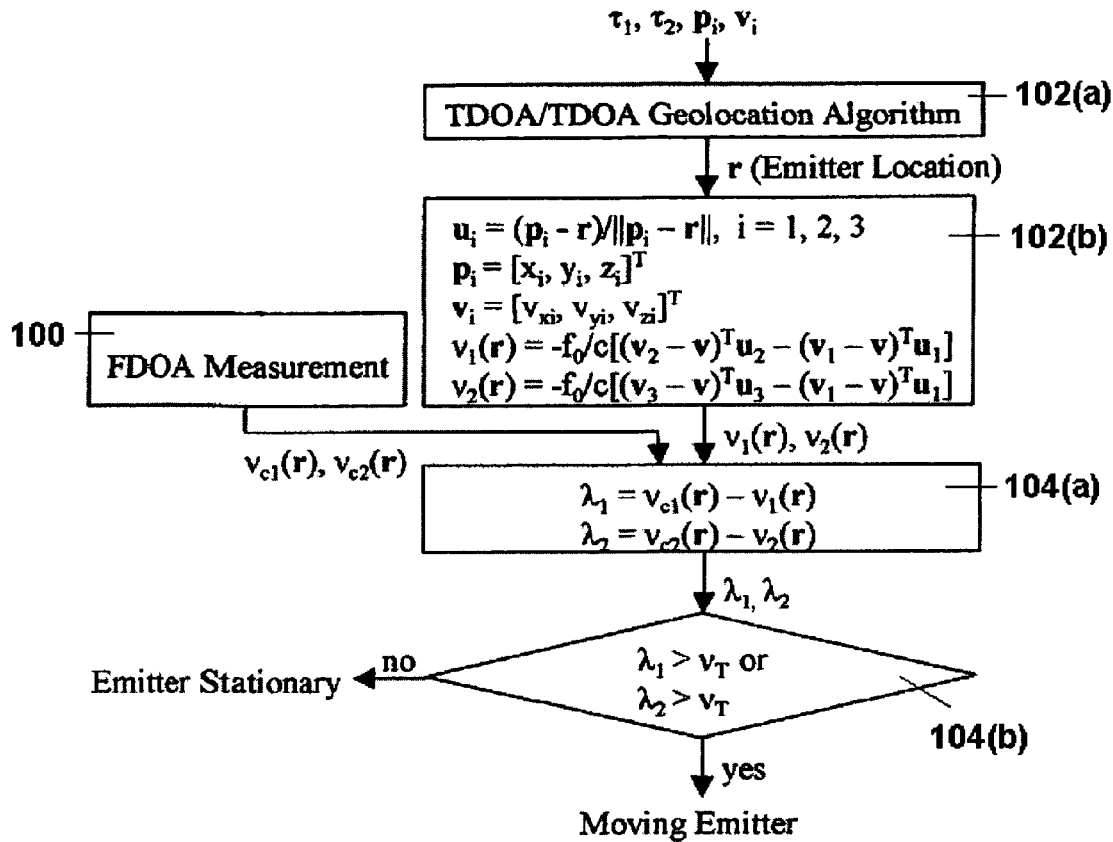
FIG. 3 is a flow chart showing some of the steps of FIG. 2 in more detail.

A flowchart of steps that may be utilized by the present invention to determine a geolocation is illustrated in FIGS. 2-3. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIGS. 2-3. For example, two blocks shown in succession in FIGS. 2-3 may in fact be executed substantially concurrently, or the blocks may sometimes be executed in the reverse order depending upon the functionality involved.

In step 100, a measured signal characteristic corresponding to a signal emitted from an emitter is acquired. The present invention may acquire the measured signal characteristic utilizing various methods, including utilizing one or more of the collector elements 18 to detect and/or receive the signal, retrieving the measured signal characteristic through the communications network 12 from one or more of the collector elements 18 and/or computing elements, retrieving the measured signal characteristic from the memory 16, etc. Thus, the present invention is not required to directly measure the emitted signal to acquire the measured signal characteristic.

The measured signal characteristic may correspond to any characteristic relating to the signal, such as angle of arrival (AOA), direction of arrival (DOA), time difference of arrival (TDOA), frequency difference of arrival (FDOA), vernier angle, emitter geolocation, emitter range, etc. Preferably, the measured signal characteristic corresponds to FDOA to simplify the estimation provided in step 102 and to enable the measured signal characteristic to be readily acquired utilizing a plurality of easily implemented methods.

In various embodiments, the FDOA measurement may be acquired utilizing the Complex Ambiguity Function (CAF). As should be appreciated by those skilled in the art, the CAF is operable to generally provide various measured signal characteristics. For instance, the CAF may provide both TDOA measurements, utilized in step 102 discussed below, and the FDOA measurement. Thus, CAF enables a single measurement to be utilized to acquire the measured signal characteristic and estimated signal characteristic, thereby deceasing the time required to detect if the emitter is moving and also reducing system cost and complexity.

As also should be appreciated by those skilled in the art, the present invention need not be limited to utilizing the CAF to acquire the FDOA measurement or any other measured signal characteristics. For instance, the FDOA measurement may be acquired by computing FDOA using other signal measurements, such as TDOA, DOA, geolocation, etc, or by using one or more collector elements 18 and/or antenna elements to compute FDOA based on differences in detected frequency.

In various embodiments, more than one measured signal characteristic may be acquired in step 100. For example, the CAF or other utilized algorithms may be operable to provide more than one measured signal characteristic, such as a pair of measured FDOAs and TDOAs, for utilization with the present invention. However, as it is preferable to undertake only one signal measurement for time, cost, and complexity purposes, the number of acquired measured signal characteristics is preferably limited to the number of characteristics that may be acquired utilizing a single measurement, as additional signal characteristics may be unnecessary.

In step 102, a signal characteristic corresponding to the signal utilized in step 100 is estimated. Preferably, the estimated signal characteristic generally corresponds to the measured signal characteristic, such that both characteristics are of the same type, i.e. FDOA, DOA, TDOA, etc, to facilitate the comparison provided in step 104. However, the estimated and measured signal characteristics may be of different types and still be utilized by the present invention.

The estimated signal characteristic is preferably estimated based on an assumption that the emitter is stationary such that the estimated and measured signal characteristics may be easily compared in step 104 to determine if the emitter is moving. For instance, if the measured signal characteristic corresponds to FDOA, the estimated signal characteristic may correspond to an estimated FDOA that assumes the emitter is stationary to facilitate comparison of the measured and estimated FDOAs.

As shown in step 102(a) of FIG. 3, the estimated signal characteristic may be estimated utilizing geolocation information such as information provided by or acquired using the CAF discussed in step 100. Specifically, the measured FDOA of step 100, a first TDOA, and a second TDOA may be concurrently provided by the CAF or various other algorithms to facilitate signal characteristic estimation. Concurrent reception of the measured FDOA and the TDOAs enables steps 100 and 102 to be performed generally concurrently to expedite emitter movement determination, as is discussed in more detail below.

In various embodiments and as shown in step 102(a), the first and second TDOAs may be utilized determine various geolocation information, such as emitter geolocation. As will be appreciated by those skilled in the art, innumerable methods exist for determining geolocation information from signal characteristics, including TDOA, such that the present invention may employ any method to determine geolocation information from one or more signal characteristics.

In step 102(b), the signal characteristic may be estimated utilizing the geolocation information ascertained in step 102(a). For example, the estimated FDOA may be estimated utilizing the geolocation and TDOA information generated or otherwise provided in step 102(a). Specifically, two estimated FDOAs, $v_1(r)$ and $v_2(r)$ may be computed utilizing the following equations:

$$u_i = (p_i - r)/\|p_i - r\|, i = 1, 2, 3 \quad (1)$$

$$p_i = [x_i, y_i, z_i]^T \quad (2)$$

$$v_i = [v_{xi}, v_{yi}, v_{zi}]^T \quad (3)$$

$$v_1(r) = -f_0/c[(v_2 - v)^T u_2 - (v_1 - v)^T u_1] \quad (4)$$

$$v_2(r) = -f_0/c[(v_3 - v)^T u_3 - (v_1 - v)^T u_1] \quad (5)$$

wherein $\tau_1$ and $\tau_2$ correspond to the TDOAs utilized in step 102(a), $p_i$ is a platform (collector) location vector with l=1, 2, 3, $v_i$ is a platform (collector) velocity vector with l=1, 2, 3, $f_0$ is a center frequency of the emitted signal, and c is the speed of light. $p_i$, $v_i$, and/or any associated elements may be retrieved from one or more of the collector elements 18 and/or be independently computed or otherwise ascertained by the computing element 10.

Although two signal characteristics are shown estimated utilizing equations 1-5, any number of signal characteristics may be estimated in step 104, including one signal characteristic. Thus, the present invention need not be limited to estimating a pair of signal characteristics. However, in various embodiments it may be desirable to estimate more than one signal characteristic, such as the pair of FDOA measurements provided by equations 4 and 5, to improve the accuracy of the comparison performed in step 104.

In step 104, the measured and estimated signal characteristics are compared to determine if the emitter is moving. Specifically, as the estimated characteristic is preferably estimated utilizing the assumption that the emitter is stationary, the measured and estimated signal characteristics will vary if the assumption is incorrect. Thus, if the estimated and measured characteristics are generally the same or similar, the emitter is stationary while if the estimated and measured characteristics are not generally the same or similar, the emitter is moving.

In various embodiments and as shown in step 104(a), two comparison values, $\lambda_1$ and $\lambda_2$ may be computed utilized the two measured characteristics acquired in step 100 and the two estimated characteristics acquired in step 102. $\lambda_1$ and $\lambda_2$ may be given by the following equations:

$$\lambda_1 = v_{c1}(r) - v_1(r) \quad (6)$$

$$\lambda_2 = v_{c2}(r) - v_2(r) \quad (7)$$

wherein $v_{c1}(r)$ and $v_{c2}(r)$ correspond to measured signal characteristics and $v_1(r)$ and $v_2(r)$ correspond to estimated signal characteristics. As should be appreciated by those skilled in the art, any number of $\lambda$s may be computed to correspond to any number of measured and estimated signal characteristics.

In various embodiments and as shown in step 104(b), the measured and estimated signal characteristics may be compared utilizing an error value to facilitate accurate determination of emitter movement. Specifically, the error value enables the measured and estimate signal characteristics to vary due to various static and dynamic errors present within measurement systems, including the collector elements 18.

The error value may correspond to any variance or error operable to be present within the system, including variances caused by users and equipment. Preferably, in embodiments where the measured signal characteristic corresponds to FDOA, the error value corresponds to a FDOA measurement error $v_t$. The FDOA measurement error value $v_t$ may be system specific or be a generalized value applicable for all systems and measurements.

$\lambda_1$ and $\lambda_2$ as computed above in step 104(*a*) may be compared to the error value to determine if the emitter is moving or stationary. For instance, when $\lambda_1$ or $\lambda_2$ are greater than the error value the emitter is deemed as moving. As should be appreciated, any combination of measured and estimated characteristics may be compared with or without utilizing the error value to determine if the emitter is moving based on a difference or lack of difference between the measured and estimated characteristics.

In various embodiments, an indication of whether the emitter is stationary or moving may be provided to users or other devices coupled to the communications network 12 by utilizing the computing element 10, such as through a display, by storing the indication in the memory 16, by transmitting the indication to the collector elements 18 or other devices and programs accessible through the communications network 12, etc.

As will be appreciated by those skilled in the art, the present invention is operable to rapidly detect emitter movement by utilizing a single signal measurement to acquire a measured signal characteristic (step 100), generally concurrently estimate a signal characteristic utilizing information relating to the single signal measurement (step 102), and compare the measured and estimated characteristics to rapidly determine if the emitter is moving (step 104). Thus, the present invention need not employ a complex network of collectors or multiple geolocation calculations to detect emitter movement.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of detecting emitter movement, the method comprising:
    acquiring a first measured time difference of arrival (TDOA) and a second measured TDOA corresponding to a signal received from an emitter;
    acquiring a first measured frequency difference of arrival (FDOA) and a second measured FDOA corresponding to the signal received from the emitter;
    estimating an emitter location based on the first TDOA and the second TDOA;
    utilizing the estimated emitter location to estimate a third FDOA and a fourth FDOA;
    generating a first comparison value by finding the difference between the first FDOA and the third FDOA;
    generating a second comparison value by finding the difference between the second FDOA and the fourth FDOA; and
    determining that the emitter is moving if either the first comparison value is greater than an error value or the second comparison value is greater than the error value.

2. The method of claim 1, wherein the estimated emitter location is based on a collector location vector.

3. The method of claim 1, wherein the estimated emitter location is based on a collector velocity vector.

4. The method of claim 1, wherein the estimated emitter location is based on the frequency of the signal received from the emitter.

5. A computer-readable medium encoded with a computer program to be executed on a computer to perform a method of detecting emitter movement, the method comprising:
    acquiring a first measured time difference of arrival (TDOA) and a second measured TDOA corresponding to a signal received from an emitter;
    acquiring a first measured frequency difference of arrival (FDOA) and a second measured FDOA corresponding to the signal received from the emitter;
    estimating an emitter location based on the first TDOA and the second TDOA;
    utilizing the estimated emitter location to estimate a third FDOA and a fourth FDOA;
    generating a first comparison value by finding the difference between the first FDOA and the third FDOA;
    generating a second comparison value by finding the difference between the second FDOA and the fourth FDOA; and
    determining that the emitter is moving if either the first comparison value is greater than an error value or the second comparison value is greater than the error value.

6. The computer-readable medium of claim 5, wherein the estimated emitter location is based on a collector location vector.

7. The computer-readable medium of claim 5, wherein the estimated emitter location is based on a collector velocity vector.

8. The computer-readable medium of claim 5, wherein the estimated emitter location is based on the frequency of the signal received from the emitter.

9. A computing element configured to detect emitter movement, the computing element comprising:
    a memory configured to store a first measured time difference of arrival (TDOA) corresponding to a signal received from the emitter, and a first measured frequency difference of arrival (FDOA) and a second measured FDOA corresponding to the signal received form the emitter; and
    a processor coupled with the memory and configured to
    estimate an emitter location based on the first TDOA and the second TDOA,
    utilize the estimated emitter location to estimate a third and fourth FDOA,
    generate a first comparison value by finding the difference between the first FDOA and the third FDOA,
    generate a second comparison value by finding the difference between the second FDOA and the fourth FDOA, and
    determine that the emitter is moving if either the first comparison value is greater than an error value or the second comparison value is greater than an error value.

10. The computing element of claim 9, wherein the estimated emitter location is based on a collector location vector.

11. The computing element of claim 9, wherein the estimated emitter location is based on a collector velocity vector.

12. The computing element of claim 9, wherein the estimated emitter location is based on the frequency of the signal received from the emitter.

* * * * *